Patented Feb. 23, 1943

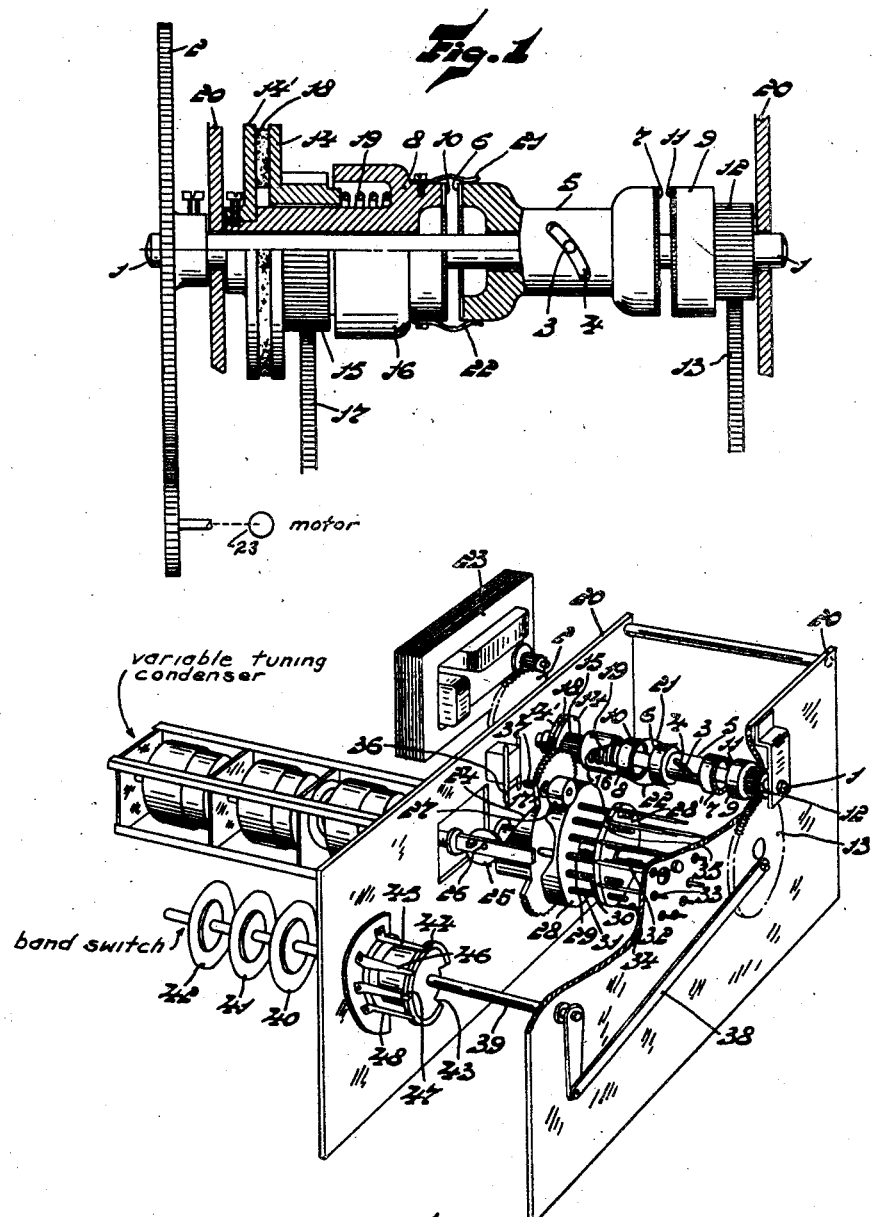

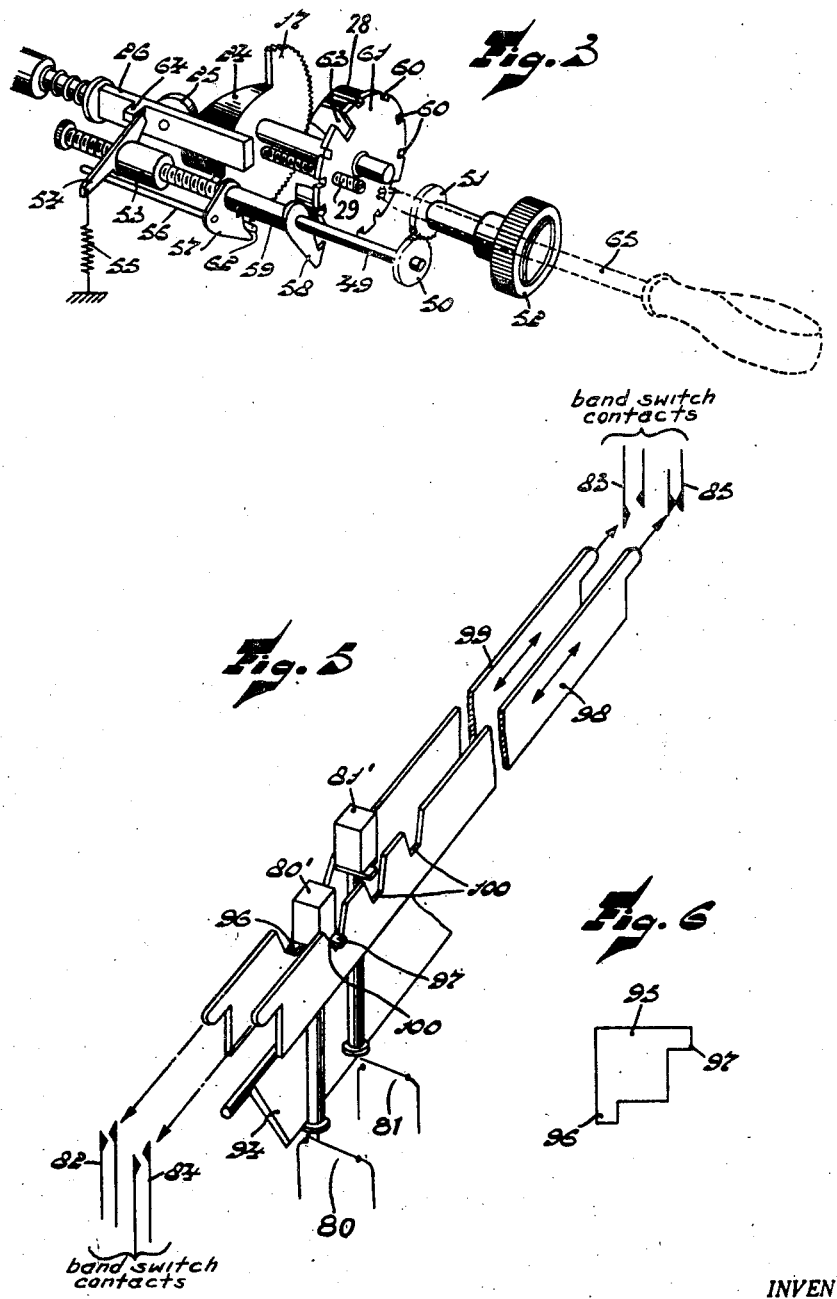

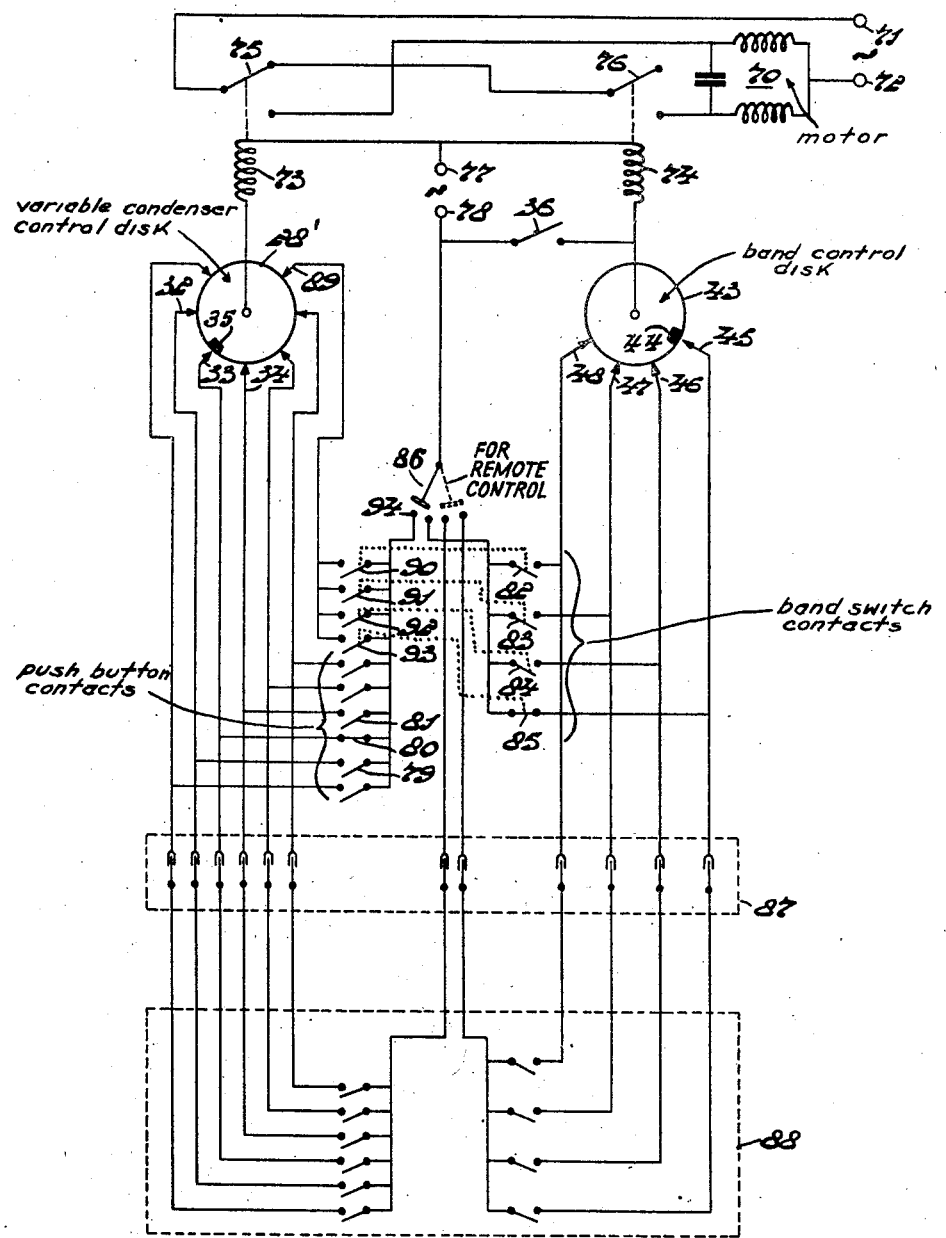

2,312,035

UNITED STATES PATENT OFFICE 2,312,035

AUTOMATIC CONTROL MECHANISM FOR RADIO APPARATUS

Maarten Jan Groenenberg, Wÿtze Hendrik van der Mey, and Johannes Antonius van Lammeren, Eindhoven, Netherlands, assignors to Radio Corporation of America, a corporation of Delaware Application June 13, 1940, Serial No. 340,326
In the Netherlands June 13, 1939

5 Claims. (Cl. 250—40)

This invention relates to radio-receiving apparatus comprising at least two adjustable members (for example a tuning member and a switch for wavelength-changing) having a common driving device.

In some cases it is desirable in radio-apparatus that two adjustable members should be operated by a common driving device instead of using to this end two separate driving devices. This may be advantageous, for example, if the operating device is located at some distance from the receiver and is connected thereto by means of a mechanical coupling (for example a Bowden cable).

In this case it is also possible for the operation to be effected by one hand without having to operate two control knobs one after another. This may be advantageous for a receiver to be used in motor cars where the driver during driving cannot pay his full attention to the receiver.

Also in receivers where two or more adjustable members are driven all of them by means of a motor use may advantageously be made of a common driving device.

According to the invention the rotation of the driving device in one direction operates one adjustable member and in the other direction operates the other adjustable member.

In this case one of the members to be adjusted can be a member determining the ultimate adjustment of the tuning members, while the second member to be adjusted may be a switch for wavelength changing.

The invention will be more clearly understood by reference to the accompanying drawings showing, by way of example, one embodiment thereof.

Fig. 1 shows a cross-section of two couplings acting in opposite direction and serving for driving the members to be adjusted.

Fig. 2 represents one embodiment of the invention wherein a slidable-electrode condenser and a switch for wavelength-changing are driven by a common motor.

Fig. 3 shows how the slidable-electrode condenser illustrated in Fig. 2 can also be operated by hand.

Fig. 4 represents an example of a wiring diagram of the motor circuit, of the auxiliary circuits and of the push-buttons in the receiver and in a control-board for remote control, which diagram may be used with motor-operation.

Fig. 5 shows the construction of a push-button board.

Fig. 6 shows a part of a push-button.

The shaft 1 shown in Fig. 1 can be driven by a motor in two directions by means of a toothed wheel 2 mounted thereon.

The shaft 1 has mounted on it a pin 3 which fits into a slot 4 which extends so as to be inclined with respect to the shaft 1 in a member 5 which is rotary and slidable on the shaft 1 and is provided at the ends with two milled edges 6 and 7.

On the shaft 1 are located two members 8 and 9 which can freely rotate with respect to the shaft but cannot slide and are provided with milled edges 10 and 11. Sliding the member 5 has the effect of the milled edges 6 and 10 or the milled edges 7 and 11 engaging each other.

The member 9 comprises a toothed wheel 12 which is concentrically arranged on it and engages a toothed wheel 13 by means of which one of the members to be adjusted is driven. The member 8 which is provided with a cylindrical shell 16 has mounted on it in a concentric and rotary manner a toothed wheel 15 provided with a flange 14. The toothed wheel 15 is coupled with a toothed wheel 17 by means of which the other member to be adjusted is driven. Between the flange 14 and a flange 14' secured to the member 8 there is provided a friction disc 18 which is pressed by a spring 19. The shaft 1 is journalled in a chassis 20. The member 8 has two plate springs 21 and 22 secured to it which bear with friction on the member 5.

When the shaft 1 is rotated by the motor, the bodies 8 and 9 stand still. The body 5 is prevented by the springs 21 and 22 from rotating and slides, in dependence on the direction of rotation of the shaft 1, to the left or to the right until the milled edges 6 and 10 or the milled edges 7 and 11 engage one another. At this moment the member 5 stops its sliding movement and begins to follow the movement of the shaft 1, the member 8 or the member 9 starting to follow the movement of the shaft in accordance with the direction of rotation of the shaft 1. When the body 5 is coupled with the body 9, the springs 21 and 22 begin to slip over the body 5.

In the following figures similar parts have been designated by the same references.

Referring to Fig. 2, the shaft 1 is driven by a motor 23. It is assumed that the direction of rotation is such that the toothed wheel 17 begins rotating. The toothed wheel 17 is provided with a helical running surface 24 over which runs a roll 25 secured to the shaft 26 of a slidable-electrode condenser. The slidable-electrode condenser is moved to the fully interleaved position by the motor through the intermediary of said members against the action of a spring which is not shown in the drawing. When the slidable-electrode condenser has reached its extreme position, a roll 27 mounted on the toothed wheel 17 and following the movement thereof abuts against the shell 16 which results in the toothed wheel 17 being stopped (which is possible due to the slipping coupling 18) and the rotating movement of the shell 16 being transmitted through the roll 27 to a member 28 hitherto unmoved. A second member 28' in the form of a disc is movable with the first member and a number of adjustable screws 29, 30, 31 pass through said members and are arranged in a circumference concentric with the shaft of said member. The just mentioned screws can be adjusted at different lengths by means of a screw-driver.

A number of stationary contact springs, certain of which are designated 32, 33, 34, are in electrical contact with the periphery of the disc member 28' which is provided with an insulated spot 35. The contact springs correspond to a number of push-buttons shown at 79—81 in Fig. 4 and 80', 81' in Fig. 5. If one of these push-buttons is depressed, the motor current or an auxiliary current controlling the motor current flows over the contact spring associated with this push-button and the member 28'. The motor rotates the member 28' until the insulated spot 35 interrupts the current and stops the member 28'. As will be set out more fully, the arrangement is such that the motor reverses its direction of rotation and is also driven in this case by the slidable-electrode condenser. The slidable-electrode condenser returns until its shaft engages one of the screws 29—31 rotated in front of it. The toothed wheel 17 rotates back further under the action of a spring which is not shown in the drawings, driving in this case also the motor, and interrupts at the end of its track a contact 36 with the aid of a cam 37 due to which the motor is switched off, unless the wavelength has still to be changed over. The slidable-electrode condenser is now in the position which corresponds to the station desired. Only the switch for wavelength-changing has still to be brought into the correct position, if necessary. This is effected in the following manner:

If, after adjustment of the member 28', the motor rotates in the direction opposite to the original the coupling between the member 5 and the member 8 remains intact due to the toothed wheel 17 driven by a spring being submitted to a reactive force from the motor. It is not until this toothed wheel has returned in its position of rest that the coupling between the members 5 and 8 is interrupted due to the fact that the reactive force from the motor now disappears and gives place to a driving force. The direction of rotation of the shaft 1 is now such that, when the member 5 is held by the springs 21 and 22 which are now in rest, this member 5 is displaced axially until the milled edges 7 and 11 engage each other. This results in the toothed wheel 13 being driven which changes by means of a driving rod 38 a rotating movement into a swinging movement of the shaft 39 on which are mounted switches for wavelength-changing 40, 41, 42. This shaft 39 has fixed to it a conductive disc 43 provided with an insulating spot 44. A number of contact springs 45, 46, 47, 48 slip over the disc 43. One of these springs is traversed by an auxiliary current which controls the motor and is interrupted as soon as the insulation spot 44 comes beneath that spring, due to which the motor is stopped and the switch for wavelength-changing remains in its position.

The wiring diagram will be discussed more fully.

Fig. 3 shows how the slidable-electrode condenser can be operated by hand.

For this purpose a shaft 49 exists which is provided with screw-thread and can be driven by a hand-knob 52 through the intermediary of two toothed-wheels 50 and 51. A nut 53 located on the screw-thread carries a lever 54 which is drawn in one direction by means of a spring 55. The lever is checked, however, by a rod 56 fixed to a plate 57 which is rotatable about the shaft 49 and, together with a pawl 58, fixed to a bush 59. The pawl 58 can alternately fit into a number of notches 60 of a disc 61 fixed on the member 28 of Fig. 2, so long as this is not prevented by a cam 62 which is provided on the toothed wheel 17 and presses against the plate 57 in the position in which the roll 27 abuts against the shell 16 and by means of which the pawl 58 is kept out of the notches 60 provided in the disc 61 so that the body 28 can rotate freely. As soon as a position desired is attained, the toothed wheel 17 runs back and the disc 61, and with it the member 28, is first mechanically readjusted and locked before the slidable-electrode condenser is allowed to run back.

In the position of hand-operation the member 28 is so rotated that there is no screw in front of the slidable-electrode condenser which consequently can run back completely. The disc 61 has one notch 63 which is deeper than the notches 60, this notch 63 being rotated in front of the pawl 58 in the position of hand-operation. As soon as the toothed wheel 17 releases this pawl upon running back, the lever 54 is allowed to rotate farther to such extent that it engages behind a cam 64 provided on the condenser shaft 26. If now the hand-knob 52 is rotated, the slidable-electrode condenser follows its movement.

The hand-knob is arranged on the chassis so as to be in alignment with the condenser shaft 26 so that the screws 29, 30, 31 can be adjusted through the hollow shaft of this knob with the aid of a screw driver 65 shown in Fig. 3 in dotted line.

Fig. 4 represents the wiring diagram of the motor and the associated auxiliary circuits.

In this figure, reference 70 is an electric motor supplied from a strong-current mains connected between terminals 71 and 72. The motor 70 can rotate to the left and to the right and operates, for example, in the former direction of rotation the slidable-electrode condenser and in the latter direction of rotation the switch for wavelength-changing.

To this end, two relays 73 and 74 exist having associated contacts 75 and 76 which are included in the motor circuit. If the two relays are not energized the motor circuit is interrupted and the motor does not move. If only the relay 73 is energized, the motor rotates to the left and if only the relay 74 is energized, the motor rotates to the right. If both of the relays are energized the motor still rotates to the left.

The relays can be energized from a low-voltage source of supply connected between terminals 77 and 78, for example, a winding provided on the supply transformer of the receiver. To this end, a certain number of push-buttons exists in the receiver, three of which are designated 79, 80, 81, and a number of contacts 82, 83, 84, 85 which are operated by the push-buttons. Each of the push-buttons can cooperate with one of the contacts 82, 83, 84, 85 by means of a predetermined adjustment. This will be explained more fully with reference to Fig. 5.

It is assumed that the conductive discs 28 and 43, which are the same as the discs 28' and 43 of Fig. 2, are not in the position shown and that the push-button 80 is depressed, in this case also the contact 85 being closed. Now two currents flow from terminal 77 through the relay 73, the disc 28', the contact spring 33, the push-button contact 80 and a switch 86 back to terminal 78, and from terminal 77 through the relay 74, the disc 43, the contact spring 45, the contact 85 and the switch 86 back to the terminal 78. Consequently, the two relays 73 and 74 are energized and the motor rotates to the left, the slidable-electrode condenser in this case being adjusted in the above-mentioned way. As soon as the disc 28' has arrived in the position shown, the relay 73 loses its energization, due to which the direction of rotation of the motor is reversed. In this case the slidable-electrode condenser runs back up to the position desired, whereupon the toothed wheel 17 of Fig. 2 is completely rotated back into the initial position. The relay 74 is still energized, due to which the motor continues rotating to the right and subsequently brings the shaft of the switch for wavelength-changing to which the disc 43 is secured, in the desired position. As soon as this is done, the relay also loses its energization and stops the motor.

However, if the switch for wavelength-changing were already in the desired position, the motor would be stopped as soon as the energization of the relay 73 disappears. Consequently, the slidable-electrode condenser would have to drive back the whole transmission mechanism from the condenser to the motor if no particular provision were made. This provision consists in the contact 36 which is also shown in Fig. 2 and which energizes the relay 74 as long as the toothed wheel 17 is not in its position of rest. Consequently the motor will always reverse its direction of rotation to facilitate the running back of the slidable-electrode condenser, even when the reversed direction of rotation is not required for wavelength-changing. From this ensues that during the running back of the condenser the switch for wavelength-changing must not be actuated. This is achieved by arranging for the toothed wheel 17 to drive the motor during running back so that the initial coupling 6—10 remains intact (due to which the coupling 7—11 cannot be established) until the toothed wheel 17 stops.

The conductors leading to push-buttons 79, 80, 81, etc., and to contacts 82, 83, 84, 85 are directly connected to the terminals of a plug board 87 to which can be connected a control-board 88 for remote control which is of the same construction as the push-button board in the receiver. On changing over to remote control it is, however, necessary to switch over the return conductor to the terminal 78 by means of a bipolar switch 86, since, when in the receiver as well as in the control-board 88 for remote control a push-button is depressed which does not correspond to the same station but corresponds to the same range of wavelengths the motor would not stop any more because the relay 73 cannot lose its energization. Common mechanical locks for the push-buttons in the receiver and in the board for remote control, which locks are not shown in the drawing, avoid the occurrence of the above-mentioned inconvenience upon depression of a push-button since the push-button which is still depressed at that moment is released and springs back.

One of the positions of the disc 28' is reserved for hand-operation of the slidable-electrode condenser. This is the position corresponding to the contact spring 89. Each of the four push-buttons 90, 91, 92, 93 brings the disc 28' in the position for hand-operation. Each of these push-buttons, however, is coupled to one of the contacts 82, 83, 84, 85 by means of which four different ranges of wavelength can be adjusted. By depressing one of the push-buttons 90, 91, 92, 93 the receiver is rendered suitable for hand-operation in the range of wavelength chosen with the aid of the push-button concerned.

Fig. 5 shows a certain number of push-buttons such as they are located in a receiver and in the board for remote control.

The push-buttons, two of which are designated 80' and 81', exhibit a common lock 94. Each of the push-buttons is provided at the bottom end with a contact serving for adjusting a slidable-electrode condenser. Moreover, each of the push-buttons has a square plate 95 having two protrusions 96 and 97, which is illustrated more clearly in Fig. 6. This plate 95, together with the push-button, can be brought at will in one of the four positions differing 90°. Rails 98 and 99 provided with notches 100 are located respectively on either side of the row of push-buttons. The two sides of the notch form a certain angle with the direction of sliding of the push-button, so that the notch at the bottom is narrower than at the top. One of the protrusions 96 or 97 of each push-button cooperates with each of the notches 100. If one of the push-buttons is depressed, one of these protrusions engages the flank of the notch and displaces one of the rails to the right or to the left in accordance with the position of the plate 95. For example, upon depression of the push-button 80', the rail 98 slides to the right, closing in this case the contact 85 corresponding to the contact 85 of Fig. 4. Consequently the desired range of wavelength can be combined with a definite push-button by bringing the push-button into one of the four said positions.

We claim:

1. In a radio receiver of the type provided with a tuning means and a band-switching means, control mechanism therefor comprising a reversible motor and a shaft actuated thereby, a first means loosely mounted on said shaft, means mechanically coupling said first means to the tuning means, a second means loosely mounted on the motor shaft, means mechanically coupling said second means to the band-switching means, and means under the control of the motor shaft constructed and arranged to actuate the first means upon rotation of the motor shaft in one direction for adjusting the tuning means and to actuate the second means upon rotation of the motor shaft in the opposite direction for adjusting the band-switching means.

2. In a radio receiver of the type provided with a tuning means and a band-switching means, control mechanism therefor comprising a reversible motor and a shaft actuated thereby, a first means loosely mounted on said shaft, means mechanically coupling said first means to the tuning means, a second means loosely mounted on the motor shaft, means mechanically coupling said second means to the band-switching means, means under the control of the motor shaft constructed and arranged to actuate the first means upon rotation of the motor shaft in one direction for adjusting the tuning means and to actuate the second means upon rotation of the motor shaft in the opposite direction for adjusting the band-switching means, a position determining means under the control of each mechanical coupling means, and means cooperating with each position determining means for determining the direction of motor shaft rotation.

3. In a radio receiver of the type provided with a tuning means having two limiting positions, control mechanism therefor comprising spring means normally urging the tuning means to one of said positions, motor driven means adapted to move the tuning means against the action of said spring means to substantially the other limiting position and during another portion of its cycle to release the tuning means, a commutator disc under control of said motor driven means carrying a plurality of adjustable stop members which are selectively operable to limit the return of the tuning means upon its release from the first position, a plurality of contact brushes, each corresponding to a predetermined position of adjustment for the tuning means, cooperating with the commutator disc, and a manually operable member corresponding to each of said contact brushes for initiating the operation of the motor driven means.

4. In a radio receiver of the type provided with a tuning means and a band-switching means, push-button control mechanism therefor comprising a first commutator disc and a plurality of contact brushes cooperating therewith for determining the adjustment of the tuning means, a second commutator disc and a plurality of contact brushes cooperating therewith for determining the adjustment of the band-switching means, a reversible motor having a drive shaft, independent means under the control of said shaft for operating first one and then the other of said commutator discs, the sequence of operation of said discs depending upon the initial direction of rotation of the motor shaft, a first set of circuit closing means associated with the contact brushes of the tuning commutator disc, a second set of circuit closing means associated with the contact brushes of the band-switching commutator disc, and a plurality of manually operable means, there being one for each of the first set of circuit closing means, each of the manually operable means being capable of manipulation to cooperate with a selected one of the circuit closing means of the second set.

5. In a radio receiver of the type provided with a tuning means and a band-switching means, control mechanism therefor comprising a motor and means actuated thereby for successively adjusting the setting of each of said means, said motor having a pair of field windings, the energization of one or the other of which determines the direction of rotation of the motor and incidentally one or the other of said means, a conductive commutator disc associated with each of said means, a relay included in circuit with each of said discs, means under control of each of said relays for causing the selective energization of said motor field windings, said latter means comprising an armature movable between a pair of contacts, a contact of each pair connected respectively to a terminal of each motor field winding, the other terminals of the windings being connected together and to one terminal of a source of potential, the other terminal of the source being connected to one of the relay armatures, and a connection from the other relay armature to the contact of said one relay armature other than the one connected to the field winding.

MAARTEN JAN GROENENBERG.
WŸTZE HENDRIK van der MEY.
JOHANNES ANTONIUS van LAMMEREN.